(12) United States Patent
Hancock et al.

(10) Patent No.: US 7,965,690 B2
(45) Date of Patent: Jun. 21, 2011

(54) TELECOMMUNICATIONS SYSTEM

(75) Inventors: Robert E Hancock, Southampton (GB); Andrej J Mihailovic, London (GB); Jochen O Eisl, Garching (DE); Philip L Eardley, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 860 days.

(21) Appl. No.: 10/571,484

(22) PCT Filed: Sep. 8, 2004

(86) PCT No.: PCT/GB2004/003853
§ 371 (c)(1),
(2), (4) Date: Mar. 14, 2006

(87) PCT Pub. No.: WO2005/027562
PCT Pub. Date: Mar. 24, 2005

(65) Prior Publication Data
US 2006/0215595 A1 Sep. 28, 2006

(30) Foreign Application Priority Data
Sep. 15, 2003 (EP) .................................. 03255750

(51) Int. Cl.
*H04W 4/00* (2009.01)
(52) U.S. Cl. ........ 370/338; 370/328; 370/351; 370/352; 370/389; 370/395.52; 455/41.2; 455/436; 455/437; 455/438; 455/439; 709/227; 709/228; 709/229; 709/238
(58) Field of Classification Search .................. 370/331, 370/338, 351, 432, 389, 328, 329, 400, 401, 370/352, 390, 330, 395.52; 455/436–444, 455/41.2; 709/201, 226–229, 238
See application file for complete search history.

(56) References Cited

U.S. PATENT DOCUMENTS
6,535,493 B1 * 3/2003 Lee et al. ...................... 370/329
(Continued)

FOREIGN PATENT DOCUMENTS
EP 1 158 742 11/2001
(Continued)

OTHER PUBLICATIONS
International Search Report.
(Continued)

*Primary Examiner* — Olumide T Ajibade Akonai
*Assistant Examiner* — Charles N Appiah
(74) *Attorney, Agent, or Firm* — Nixon & Vanderhye P.C.

(57) ABSTRACT

A telecommunications system includes a mobile network having a plurality of portable communication devices, and a fixed network which includes a signaling agent, a plurality of directory agents, and a plurality of spaced apart attachment points to which the mobile network can attach. In use, each directory agent stores a routing table for routing data to a respective mobile communication device associated with that directory agent. When the point of attachment of the mobile network changes, the mobile network sends a change-of-address message to the signaling agent. In response, the signaling agent is configured to forward the change of address to each directory agent, so that each can update its routing table to take into account the changed point of attachment of the mobile network. Because a signaling agent is provided, each portable device need not itself notify its directory agent when the mobile network moves, and the amount of signaling between the mobile network and the fixed network when the mobile network moves is reduced.

31 Claims, 2 Drawing Sheets

U.S. PATENT DOCUMENTS

| | | | |
|---|---|---|---|
| 6,721,297 B2* | 4/2004 | Korus et al. | 370/338 |
| 6,795,705 B1* | 9/2004 | Warrier et al. | 455/435.1 |
| 6,947,398 B1* | 9/2005 | Ahmed et al. | 370/331 |
| 6,954,442 B2* | 10/2005 | Tsirtsis et al. | 370/328 |
| 6,973,057 B1* | 12/2005 | Forslow | 370/328 |
| 7,031,709 B2* | 4/2006 | Watanabe et al. | 455/436 |
| 7,228,431 B2* | 6/2007 | Haddad et al. | 713/182 |
| 7,284,057 B2* | 10/2007 | Kulkarni et al. | 709/227 |
| 7,564,824 B2* | 7/2009 | O'Neill | 370/338 |
| 2002/0114323 A1* | 8/2002 | Chowdhury et al. | 370/352 |
| 2004/0047348 A1* | 3/2004 | O'Neill | 370/389 |
| 2004/0142657 A1* | 7/2004 | Maeda | 455/11.1 |
| 2004/0174876 A1* | 9/2004 | Peirce et al. | 370/389 |

FOREIGN PATENT DOCUMENTS

| | | |
|---|---|---|
| EP | 1 328 132 | 7/2003 |
| WO | WO 03/045087 | 5/2003 |

OTHER PUBLICATIONS

International Preliminary Report on Patentability issued Mar. 16, 2006 in International Application No. PCT/GB2004/003853.

* cited by examiner

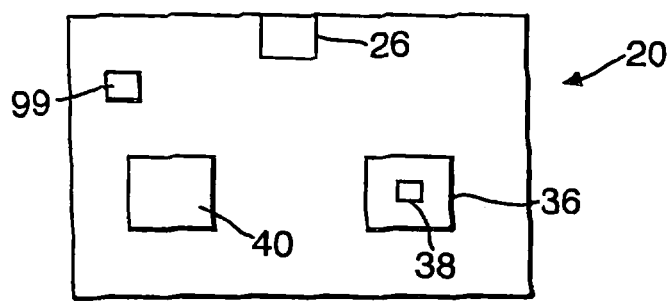
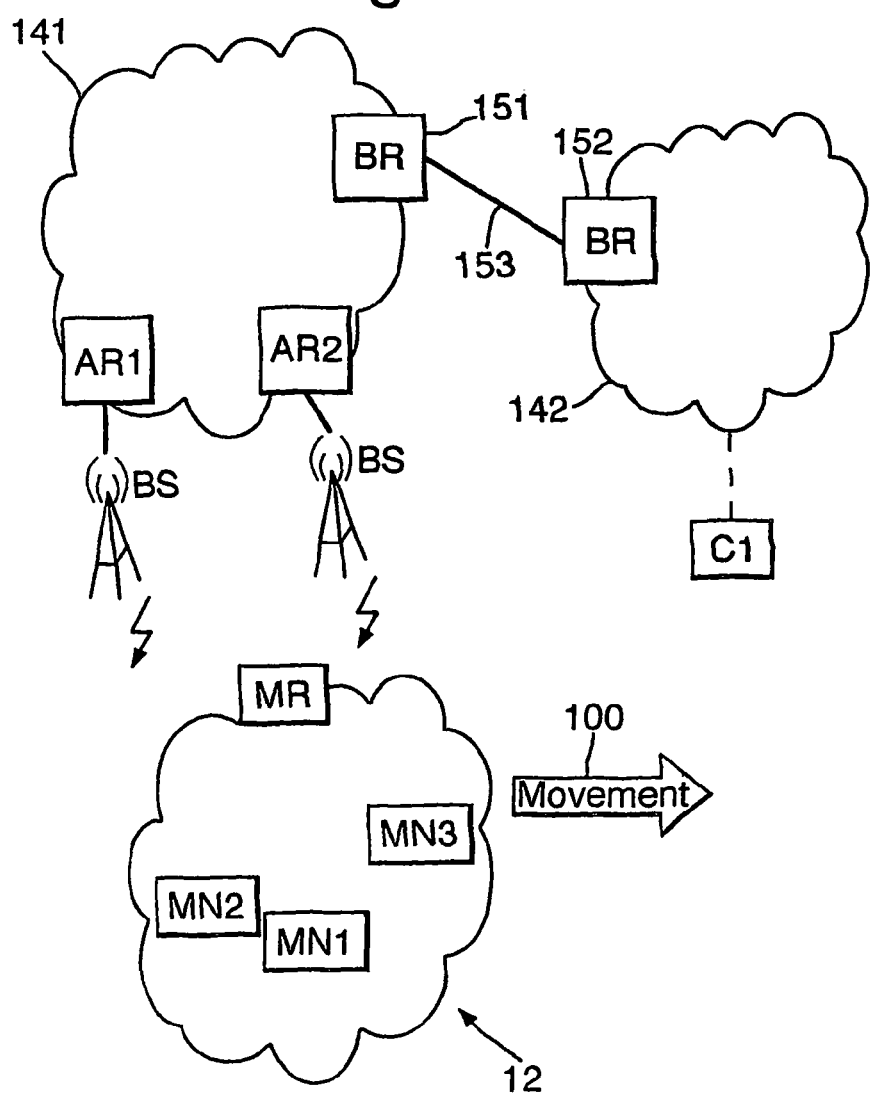

TELECOMMUNICATIONS SYSTEM

This application is the US national phase of international application PCT/GB2004/003853 filed 8 Sep. 2004 which designated the U.S. and claims benefit of EP 03255750.6, dated 15 Sep. 2003, the entire content of which is hereby incorporated by reference.

BACKGROUND

1. Technical Field

The present invention relates to a telecommunications system, in particular to a telecommunications system which includes a mobile network.

It is known for portable communication devices to attach to different points on a network. Thus, for example, a user can connect a portable computer to one attachment point, move to a new geographical location where there is provided another attachment point and attach the computer to the network at that new attachment point. Where users travel together, for example on a common vehicle such as a train or aeroplane, it can be advantageous for the communication-equipment of each user to be connected to, a local network, such as a Local Area Network (LAN) within the vehicle. As well as being able to communicate amongst each other, the users will normally be able to receive common services from the local network. Furthermore, if the attachment to the main network is through a radio link, and the local network includes a transmitter/receiver, the communication devices may take advantage of the transmitter/receiver provided by the local network.

2. Related Art

So that the communication devices can be reached at different attachment points on the main network, a directory facility such as a "Home Agent" can be provided in the main network. The directory facility for each communication device normally stores information which can be used to facilitate the routing of data to the current attachment point of the communication device. The directory facility may contain the address corresponding to the current attachment point, or the directory facility may contain another address indicative of a location where further routing information can be found. When the attachment point of a communication device changes, the communication device will normally send a message to the directory facility associated with it, so that the routing information stored in the directory facility can be updated to reflect the change in the attachment point of the communication device.

However, in the case where a plurality of communication devices move together as part of a local or mobile network, the amount of signalling required between the communication device's and their respective directory facilities when the point of attachment changes can be undesirable.

BRIEF SUMMARY

According to one aspect of the present invention, there is provided a telecommunications system including: a mobile network having a plurality of portable communication devices, and router means arranged in use for routing data to and from the portable communication devices; and, a main network which includes a signalling agent, a plurality of directory agents, and a plurality of spaced apart attachment points to which the mobile network can attach in order to communicate with the main network, wherein in use, each directory agent stores routing information for routing data to a respective mobile communication device associated with that directory agent, and wherein, in response to a signalling message from which it can be inferred that the point of attachment of the mobile network has changed, the signalling agent is configured to send a respective update message to each directory agent, the update messages each including updated routing information such that on receipt of the, updated routing information, each directory agent can update the stored routing information thereof so as to take into account the changed point of attachment of the mobile network.

Because the signalling agent is configured to send a respective update message to each directory agent, the need for each communication device to send such a message itself to its respective directory agent is reduced. This will reduce the amount of signalling generated to update the directory facilities when the mobile network changes its attachment point, as compared to the signalling that would be generated if each communications devices were to attempt to contact their respective directory agents. The reduction in traffic will be particularly important in the case of communications devices travelling as part of a mobile network, as such communication devices are likely to each change their point of attachment at the same time. Preferably, the mobile network is configured to (generate and/or) transmit the signalling message, although the signalling message may alternatively be sent by a node at the current point of attachment of the mobile network. The signalling message will preferably include information indicative of the topological position of the changed point of attachment of the mobile network. For example, the signalling message may include a routable network address which corresponds to the current point of attachment.

The respective routing information stored by each directory agent will preferably include information from which the point of attachment of the or each portable communication device associated with that directory agent can be ,inferred or from which the location (e.g. the topological location) of a device can be inferred. The point of attachment may be inferred directly, or indirectly: for example, a directory agent may store the address of an intermediate router, the intermediate router itself storing a record of the current point of attachment of the mobile network.

To allow the mobile network to be temporarily attached to an attachment point on the main network, the attachment points will preferably be provided with respective wireless communication means, the mobile network including further wireless communication means such that a wireless link can be formed between an attachment point and the mobile for communication therebetween. This will conveniently allow a link between the main network and the mobile network to be formed and broken. Alternatively, the link may be electrical, the attachment points having respective releasable electrical connector means.

The attachment points will preferably be stationary, and may be provided by respective ground base stations. However, the attachment points could be formed by satellite nodes, the nodes being either moving with respect to a ground reference point or alternatively stationary, in the manner of a geo-stationary satellite. In a preferred embodiment, the main network is a ground network, the signalling agent and at least one directory agent being provided in one or more ground nodes. This will conveniently allow the signalling agent to be used as part of an existing (modified) network.

The nodes of the portable devices will preferably be configured to send a respective or collective registration message indicative of the identity and/or the network location of the respective directory agent of each portable device. The signalling agent may store and then use this identity and/or location information to send updated routing information to each of the directory agents. Thus, the signalling agent will reduce the need for the mobile network to transmit this identity/location information each time the mobile network changes its point of attachment. This will be particularly advantageous if the directory agents each have a different network address, for example if the network agents are located at different geographical locations. The separation between directory agents may be at least 1 km or 10 km or even 100 km.

The registration message will preferably also include an indication of any caller node(s) which may wish to contact a portable device, or for example which is/are presently in communication with that portable device. This may be useful if the caller nodes are configured to support route optimisation, in which case an update message may be sent to a caller node, such that the caller node can route data directly to the new location of the portable device with which it communicates.

A plurality of signalling agents may be provided, each acting for a plurality of portable devices. A plurality of signalling agents may be useful if for example the mobile network has different classes of portable devices, such as portable "laptop" computers or mobile telephones, where each class of device has different signalling requirements.

The main network will preferably have a predetermined topological structure. Normally, the network will be formed by a plurality of nodes, and a plurality of links for connecting the nodes, each node in the main network having a respective network address for routing data thereto. Each node may be a router or other data processing equipment, and need not be located at the intersection of network paths. For example, a node may be formed by terminal equipment, such as a computer terminal, or other communications equipment. Preferably, the signalling agent and each directory agent will be implemented in one or more nodes, the nodes and/or agents each having a network address which is indicative of the respective topological position of each respective node and/or agent. The functionality of a given agent may be distributed between two or more nodes, which nodes need not be co-located. The main network may include two or more sub-networks, the sub-networks for example being administered by different administrators. The directory agents may be located in the same sub-network, or the directory agents may be distributed-between the sub-networks.

When the mobile network moves, the portable devices of the mobile network will preferably move together, any relative movement between the portable devices being superposed on the movement of the mobile network. Thus, the movement of the portable devices may be described by the movement of a common reference point, any movement of the devices relative to that common reference point being small in comparison to the movement of the reference point itself. Moveable support means may be provided for supporting the portable devices, such that movement of the support means will cause a common movement of the portable devices. The support means may be a platform, or a vehicle, such as a train. Preferably the topological structure of the mobile network will remain the same as the mobile network moves. The mobile network may be a Local Area Network. Alternatively, the mobile network may be a Personal Area Network (PAN), in which a plurality of portable devices are connected together and mounted on a person. The devices forming a PAN may be connected by a wireless link, and may form connections between themselves on an ad hoc basis (for example one of the devices acting as a mobile router, or alternatively, the devices may need to be connected to one another or to a mobile router by a user). The PAN may include attachment means for releasable attaching the devices to a person.

The mobile network may have two or more routing devices for connecting the portable devices, so as to route data within the mobile network. The connections between portable devices and a router may be formed by a respective electrical connection, or a radio link. Although the devices connected within a mobile network may change as devices enter or leave the network, the topological-structure of the mobile-network will preferably remain unchanged as the mobile network moves.

In order to route data efficiently through the main network, the addresses of the nodes in the main network will preferably be arranged in a hierarchical structure relative to one another, each address including an ordered set of components, each node having a hierarchical level associated therewith, each component of an address corresponding to a hierarchical level, wherein a high level node at one hierarchical level is connected to a plurality of low level nodes which are at a lower hierarchical level, the addresses of the respective lower level nodes being such that the value of the component corresponding to the level of the high level node is common to each low level node. In such a system, the respective addresses of the high level node and the lower level nodes connected thereto will share the same prefix, the leading components being the same for each address. To distinguish between the different nodes, the address of each node will preferably have different trailing components; that is, the suffixes will be different for each address. Examples of such a system include systems running according to the Internet Protocol, such as IPv6 or IPv4. In such a system, data will preferably be transported as data packets, each packet having a payload portion, and an address portion in which the destination address of the packet is stored.

Preferably, each portable device will have an identifier such as a network address, name or other identifier associated therewith, which identifier is retained by the portable device as the mobile network moves from one attachment point to another, the directory agent for each portable device storing a mapping between the identifier for that device and a temporary address indicative of (or routable to or through) the current attachment point of the mobile network. In one embodiment, the identifier of a portable device is a network address. The network addresses of a portable device and its associated directory agent will preferably be topologically related, such that the directory agent can intercept data addressed to its portable device, and forward that data towards the portable device. However, if the identifier of a portable device is a name, for example a DNS name or SIP URI, the network addresses of a portable device and its associated directory agent are unlikely to be topologically related.

So that the directory agent for a portable device can more easily route data towards that device and/or so that the directory agent for a portable device can more easily inform a node that wishes to communicate with the portable node of the portable node's current temporary address, the signalling agent will preferably update the directory agents by sending each agent a message, the message for a given directory agent including the current (temporary) address of the or each portable device associated with that agent. Different messages may be addressed to different directory agents, or alternatively the signalling agent may broadcast a collective message to all the directory agents.

In a preferred embodiment, the portable devices and the router means of the mobile network will be allocated related temporary addresses, which related addresses have a common prefix portion. The temporary address associated with the current point of attachment will preferably have a prefix portion which is the same as the prefix portion of the addresses allocated to the mobile network. Since the prefix portion will preferably be indicative of the topological position of the attachment point, the allocation of addresses with this same prefix to the mobile network will facilitate the routing of data to the mobile network. In such a situation, the signalling message from the mobile network will preferably include at least one address, the address having the common prefix portion. Likewise, the update message from the signalling agent to each directory agent will preferably include an address having the common prefix portion. The update message for a directory agent may include the temporary address of a portable device itself, or alternatively, the update message may contain the temporary address allocated to the router means of the mobile network, in which case the router means will preferably be configured to open incoming packets and determine which of the portable devices of the mobile network that packet should be addressed to.

Further aspects of the invention are specified in the appended claims. The present invention is described in further detail below, by way of example, with reference to the following drawings in which:

BRIEF DESCRIPTION OF THE DRAWINGS

FIG. 2 shows in more detail a mobile router shown in FIG. 1; and,
FIG. 3 shows a further network system.

DETAILED DESCRIPTION OF EXEMPLARY EMIBODIMENTS

Figure 1:
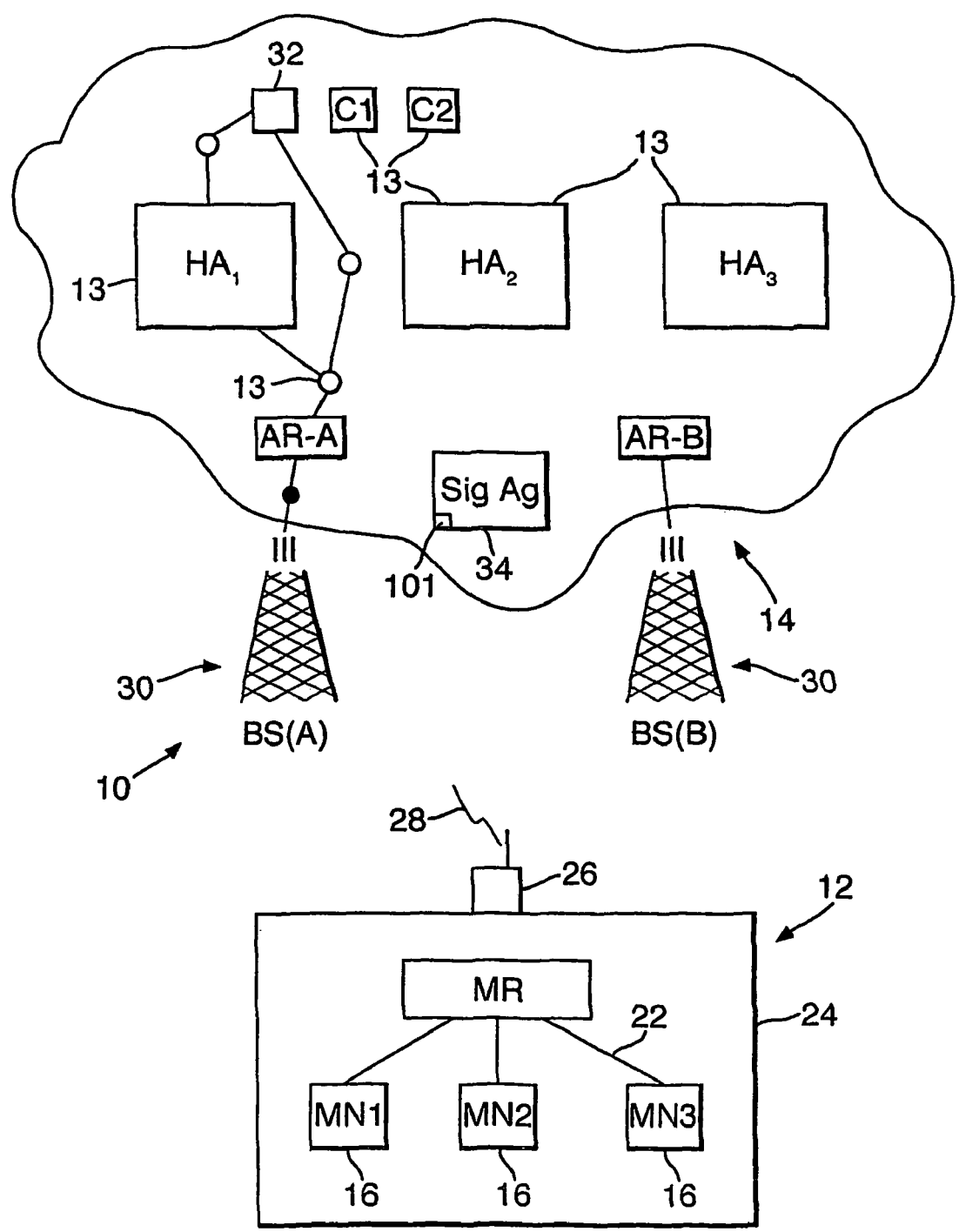
FIG. 1 shows a network system-according to the invention.

With reference to FIG. 1, it is known to have a prior art network system 10 in which a mobile network 12 can communicate with a fixed (main) network 14, the fixed network having a plurality of nodes 13 which are generally static. (FIG. 1 shows a system according to the present invention but will be used to describe the prior art, like components in the prior art and in the invention being given like numerals). The mobile network 12 includes a plurality of moveable or otherwise mobile nodes 16 (portable devices), each of which is connected to a mobile network 12 by a respective connection 22. A mobile node may for example be a mobile telephone or computer equipment such as a "laptop" computer, or other portable communications equipment, each respective connection 22 to the mobile router being a wired or wireless connection. When the mobile network 12 moves, the mobile nodes 16 move together with the router 20, such that the mobile nodes retain their respective connections 22 with the router 20. For example, the mobile router 20 may be included in a train or other vehicular system, and the mobile nodes may each be personal communications equipment carried by passengers on the train. Such a mobile network 12 is also known as a vehicular network. Clearly, as the train is moving, the mobile nodes will generally move in common with the mobile router 20, although some relative movement between the nodes may occur as passengers move within the train. The composition of the mobile network 12 will generally be temporary as some mobile nodes will cease their connection 22 with the router 20, and leave the network, (e.g., when a passenger gets off a train), whilst other nodes may join the network and form a new connection 22 (e.g., when a passenger gets onto a train).

The mobile router 20 has a wireless transmitter/receiver stage for communicating over a wireless radio link 28 with a base station 30 of the fixed network 14 (in the example of FIG. 1, the mobile network 12 is within range of base station BS-A).

When the mobile network 12 moves from a point within range of a first mobile station BS-A, to a point within range of a second base station, BS-B, a handover process occurs, in which the radio link 28 with BS-A is discontinued and a new radio link is formed with BS-B, such that the-mobile network "attaches" to BS-B. In order for a caller node C1 to communicate with one of the mobile node, say MN1, the data between the caller node C1 and the mobile node MN1 must be routed through the fixed network 14, in particular through the correct base station, the correct base station 30 being dependent on the position of the mobile network as the mobile network moves. Several systems/protocols exist for routing data through the correct base station. In the IPv6 (Internet Protocol version v6) system, each node 13 (including the base stations 30) is allocated a permanent IP address by an allocation unit 32. Each address has a plurality of components, 16 in the case of IPv6, each-component belonging to a different hierarchical level. Addresses can be represented in the form a.b.c.d . . . , where each letter corresponds to a component, higher letters of the alphabet corresponding to lower level components. The topology of the fixed network 14 is arranged such that the addresses of lower level nodes, each of which is connected to a common node at the next level above, will share a component. The level of the shared component corresponding to the level of the common node. This allows packets to be routed between nodes in the fixed network solely on the basis of the IP address of the destination node carried by the packet.

The mobile router 20 and the mobile nodes 16 each have a permanent address allocated to them (by the address allocation unit 32). However, because these nodes do not have fixed topological positions, within the network system 10, the IP addresses of these nodes will not normally indicate their position with regard to other nodes of the fixed network, and thus the IP address of a mobile node will not normally in itself be sufficient for a packet addressed to it position of that node.

To allow a mobile node to "found" in the network system, and to therefore allow packets to be routed to a mobile node, a base station 30 will normally allocate a temporary address to a node connected to it. In IPv6, such an address will normally be a "co-located care of address", this being allocated to a mobile node from a set of spare v6 addresses which that base station has previously been allocated by the allocation unit 32. The care of address allocated by a base station will have a component in common with the permanent address of the base station itself, the position of that component in the address corresponding to the hierarchical position, of the base station, so that packets whose destination is one of the allocated care of addresses can be routed to the issuing base station. To allow the base station to route packets to the appropriate mobile node, the base station will keep a table which maps the care of address of each mobile node to the radio channel which the mobile router 20 is configured to receive. Each base station BS-A, BS-B will normally be connected to the fixed network via respective access routers AR-A, AR-B, which access routers may store and allocate care, of addresses, the base stations serving merely to transmit messages from the access routers.

Each mobile node has associated therewith a home agent (HA) node, the home agent being topologically located such that it can intercept packets being sent to the permanent address of the mobile node with which it is associated (for simplicity, it is assumed that a home agent anode only has one mobile node associated with it). The home agent will store, in a correspondence table, a mapping between the permanent address of its mobile node and the care of address currently allocated to the mobile node. (Thus, each home agent will store a mapping between on the one hand an identifier for the mobile node associated with the home agent, and on the other hand a temporary address for other routing information for routing data to associated mobile node: in the case where a home agent acts for a plurality of mobile nodes, the home agent will store such a mapping for each mobile node). If the home agent intercepts any packets for that mobile node, the home agent is configured to encapsulate each packet it intercepts in a packet whose destination address is the care of address of the mobile node, thereby establishing a "tunnel" between the home agent and the mobile network. The home agent then transmits the encapsulated packet towards the mobile network. Because the care of address is indicative of the topological position of the base station to which the mobile node is connected, the encapsulated packet can be routed to the mobile node in the normal way.

In the case of a mobile network where the mobile nodes are routed through another mobile node such as the mobile router MR of FIG. 1, the base station BS-A to which the mobile node is connected will allocate a set of address to the mobile network, one for each node MN1-MN3. The addresses allocated to the mobile network 12 will preferably have a component in common with a correspondingly positioned component in the address of the base station, (that it, the addresses will have the same prefix). The prefix will have a radio channel associated therewith (through a mapping at the base station), the radio channel being received by the mobile router 20, such that packets addressed to any of the mobile nodes MN1-MN3 will inevitably be sent to the mobile router by the base station BS-A. In turn, the mobile router will store a mapping between the connection to each mobile node (identifiable by its permanent address, for example) and the care of address associated with that mobile node. A system in which a home agent HA1 is provided thus allows a caller node C1 to contact a mobile node such as MN1 without the caller node C1 requiring knowledge of the current location of MN1; caller node C1 simply sends packets to the permanent address of the mobile node MN1 with which it is communicating.

Although each mobile node may share a common home agent, different mobile nodes will often each have a respective home agent associated with them as indicated in FIG. 1, where home agents HA1, HA2, and HA3 are each provided for mobile nodes MN1, MN2, MN3 respectively. Normally, the home agents will have addresses which are unrelated to one another. Each home agent (and likewise the signalling agent) will normally be implemented in hardware including one or more processors and memory, the hardware preferably being part of the computer apparatus of a node.

When a mobile node, say MN1, attaches to the network 14 at a new point, for example through base station BS-B, the mobile node MN1 will register its new care of address with its home agent HA1, and the home agent will update its correspondence table so as to map the mobile nodes permanent address to the new care of address. Likewise, each other mobile node MN2, MN3, which is part of the mobile network 12, will register its new care of address when it attaches to a new point on the network. However, in the case of a mobile network where the mobile nodes MN1-MN3 of the mobile network generally move together, the mobile nodes are likely to connect to a new base station at substantially the same time, in particular where traffic from the mobile nodes is routed through a common mobile router MR as shown in FIG. 1. The mobile nodes are therefore likely to attempt to send registration signals to their respective home agents over the wireless link 28 between the mobile router and the new base station substantially at the same time. Such signalling can be undesirable over the radio link 28 as this link is of relatively low bandwidth as compared to cable links between nodes of the fixed network.

To reduce the amount of signalling required between the mobile network 12 and the fixed network 14, in particular the amount of signalling over the wireless link between the two networks when the mobile network 12 attaches to a new point on the fixed network 14, there is provided a signalling agent 34 in the fixed network. The signalling agent is configured to notify the home agent (e.g. HA1) for each mobile node (e.g. MN1) when the mobile nodes attach to a new point on the network, and to provide the home agents with the updated address information required for the home agents to "tunnel" packets to the newly located mobile nodes. Since only a single message is required from the mobile network for the signalling agent 34 to be notified of the new location for the mobile nodes, as opposed to a separate message from each mobile node, the amount of bandwidth used over the radio link between a mobile network and a base station is reduced. The base station can then use the limited bandwidth available to communicate more efficiently with other nodes or mobile networks. The amount of bandwidth saved by the presence of the signalling agents will be particularly important where there are many mobile nodes on the mobile network. Although only three nodes are shown in FIG. 1, a mobile network may have at least 10 mobile nodes, or at least 100 mobile nodes, or even at least 1000 mobile nodes.

As shown in FIG. 2, the mobile router 20 has a routing stage 36 for routing packets received from the wireless stage 26 to one or more of the mobile nodes 16, and, for channelling packets from the mobile nodes to the wireless stage 26 for outbound transmission. The routing stage 36, wireless stage 26 and signaling stage 40 need not be co-located in the same node. A mobile network may include more than one instance of any of these stages. For example, there may be a wireless stage that communicates with satellite nodes and another wireless stage that communicates with GPRS base stations. However, the mobile network preferably has a mobile router 20 that includes all three stages; The routing stage 36 stores a routing table 38 mapping, for each mobile node 16 that forms part of the mobile network, the permanent address of that mobile node (or another indication of identity) to (a) the channel or other port over which the mobile router, 20 can communicate to that node and (b) the care of address temporarily allocated to that node. In addition, the mobile router 20 has a signalling stage 40 for generating/forwarding signalling information to the signalling agent 34.

The operation of the signalling agent 34 and/or the signalling stage 40 will be described below with reference to the following steps (which need not be carried out in order): a registration step in which the mobile nodes 16 and the signalling stage 40 register with the signalling agent 34; a de-registration step in which mobile nodes 16 and the signalling stage 40 inform the signalling agent 34 that the signalling agent is no longer to send signals on their behalf; a mobility update stage in which the signalling step informs the signalling agent that the mobile network has moved to a point within range of a new base station; and, a signalling step in which the signalling agent sends messages on behalf of the mobile nodes (and possibly the signalling stage).

In the registration step, (once communication is possible between the fixed network 14 and the mobile network 12 as in the prior art), the signalling stage 40 will send a message to the signalling agent 34 indicative of the identity of the signalling stage. This information will be useful to the signalling agent as the signalling agent may act for several mobile networks, each mobile network having its own signalling stage. If incoming traffic enters the mobile network via a single router co-located with the signalling stage as shown in FIG. 1, the identity of the signalling stage will simply be the permanent address of the mobile router 20 (that is, the mobile router's "home" address, which home address is topologically located to the mobile router's home agent). Alternatively, if the signalling stage is not co-located with the mobile router but located on another node, then the signalling stage may be identified, for example by that node's IP address or MAC address, depending on the configuration of the mobile network. Each mobile node 16 within the mobile network 12 will register with the signalling agent 34 by sending a message to the signalling agent, which message includes an identifier for the mobile node, such as its permanent address. The mobile router will also indicate to the signalling agent 34 the address of the signalling stage associated with that router. Although the signalling stage may be separate from the mobile router, for simplicity, it will be assumed that the signalling stage 40 is co-located with the routing stage, such that the functionality of the routing stage 36 and the signalling stage 40 is combined within the mobile router 20. In this case, the identity of the signalling stage will be the permanent address of the mobile router 20. Each mobile node will also indicate to the signalling agent 34 which protocol is to be used for communication between the signalling agent 34 and the home agents (that is, the protocol which the mobile node is configured to normally use), since there may be situations where a mobile node is not IPv6 is enabled (in which case translation means may be required).

Each mobile node will send to the signalling agent 34 a list indicating the respective addresses of the nodes which should be updated with the mobile node's care of address when the mobile network attaches to a new base station. For each mobile node, the "receiving nodes" which should be informed of the mobile node's new care of address include that mobile node's home agent, so that the home agent can update its correspondence table when necessary with the mobile node's current care of address. This list of receiving nodes for a mobile node will preferably also include the addresses of other nodes such as "calling nodes" which are or will be in communication with that mobile node. Such calling nodes could include news providers which send news items at intervals to nodes on their membership list. Alternatively, a calling node may be a mobile telephone in communication with a mobile node. In either case, it would be useful for the signalling agent to be able to update these calling nodes with the mobile node's new care of address. If route optimisation is taking place, and a tunnel has been established between a calling node and a mobile node, then if a calling, node is informed of the mobile node's new care of address, a new tunnel can be established directly, without first contacting the home agent of that mobile node.

As an alternative to the registration method described above, the mobile router 20 may register with the signalling agent 34, (after the mobile nodes have registered with the mobile router), and the mobile router may send to the signalling agent a message indicating the permanent address of each mobile node registered with the mobile router (as opposed to simply routing the registration messages of each mobile node). As a further alternative, the mobile router may intercept the registration messages of the mobile nodes, and send a registration message itself on behalf of the mobile nodes. In this way, the signalling agent 34 will be able to store information indicative of the identity of each mobile node 16 for which it is to act.

In order for mobile nodes to discover the existence of the signalling agent 34, the signalling agent may send each mobile node which enters the mobile network 12 a message. This message will indicate the address of the signalling agent 34 and preferably indicate the type of mobility management messages which the signalling agent 34 can send, as well as other indications of the capabilities of the signaling agent. Alternatively, the signalling agent 34 may be reachable at a "well-known" address which has been previously been entered into the memory of each mobile node. In either case, when the mobile node enters the mobile network 12, for example by connecting to the mobile router 20, the mobile node can attempt to register with the signalling agent.

The mobility update step takes place when the mobile network 12 changes its point of attachment on the fixed network 14, for example when the mobile router 20 ceases to communicate with BS-A and instead communicates with BS-B. When this occurs, the mobile router 20 and the mobile nodes 16 will lose the care of addresses previously allocated to them by the base station BS-A, which care of addresses will each be replaced by a new set of addresses issued by the base station BS-B. The message(s) sent by the mobile router 20 to the signalling agent 34 when the mobility update takes place will depend on the way in which the mobile nodes are allocated care of addresses by the base station. In one embodiment where a base station delivers a set of addresses to the mobile router, which addresses are related by a common prefix, the following steps are carried out: (i) each mobile node is issued with a care of address (for example at a base station) which care of address includes the common prefix, the suffix of the address being related to a unique identifier for the mobile node, (such as the mobile node's MAC address) in order to reduce the risk of address duplication; (ii) at the registration stage, the mobile router informs the signalling agent 34 that upon a change of point of attachment, each mobile node will retain its suffix, the new care of address of each mobile node having the new prefix for the new location, followed by the existing suffix; (iii) when the point of attachment of the mobile network changes, a signalling message with the new prefix for the new location is sent to the signalling agent; and, (iv) the signalling agent (which has stored a mapping between an indication of each mobile node and the suffix for that mobile node received at the registration stage) then combines the new prefix and the existing suffix for each mobile node so as to form the care of address for each mobile node, and the signalling agent then sends respective update messages with the new care of address to each home agent. This will reduce the amount of signalling required over the radio link 28 when carrying out the update step, since only the prefix of each new care of addresses needs be transmitted, as opposed to each entire care of address each time the mobile router attaches to a new point in the fixed network 14.

In another embodiment, the mobile router will not request specified suffixes for the care of addresses it receives from a base station. In the mobility update step, the mobile router will then inform the signalling agent of the entire new care of addresses allocated to itself and to the mobile nodes 16.

Once the signalling agent 34 has received information from the mobile router indicative of the new care of address of at least some of the mobile nodes, the signalling agent 34 can carry out a signalling step in which the signalling agent informs the respective home agent of each mobile node of the mobile node's new care of address. To do that, the signalling agent will retrieve from a memory location the addresses of the home agents previously received at the registration stage, and will send "binding agent" information to each home agent indicating to that home agent the new care of address of its mobile nodes. If a home agent is acting for more than one mobile node in the mobile network 12, the signalling agent will send an update message to the home agent which update message will include: an identifier which identifies the list of mobile nodes (identified by their respective permanent addresses) which the signalling agent is acting for (the permanent addresses in the list having previously been sent to the signalling agent at a registration stage); the new care of address for each mobile node; and, an indication that the update is for the aforementioned list.

An update message will preferably also be sent by the signalling stage 34 to one or more correspondence or "calling" nodes, such as node C1 or C2. Although the home agent of a portable device will allow the calling node to reach that portable device without the calling node being aware of any changes in the attachment point of the mobile network, a calling node may be configured to carry out route optimisation, such that the calling node sends messages to the portable device directly rather than through the home agent. In such a situation, an update message from the signalling agent containing the new care of address of a portable device can be used by the caller node to carry out fresh route optimisation and send packets directly to the new location of the portable device.

Clearly, once a mobile node has successful registered with a signaling agent, it may be advantageous that, when the mobile node receives a new care of address because the mobile network has changed its point of attachment on the fixed network, the mobile node ceases to send update messages to its respective home agent, since the signaling agent will send update messages to its directory agent(s) as required on its behalf.

The main network may include more than one signaling agent 34. The mobile router 20 currently registered with a signaling agent may register with another signaling agent. Such re-registration could be carried out following for example a request from the first signaling agent. Alternatively the mobile router may decide to re-register, for example because it is significantly nearer to the second signaling agent, or the second signaling agent has better capabilities or it is cheaper to use. Preferably the second signaling agent would obtain the information from the first signaling agent about the mobile node's 16 currently registered with it. Re-registration would preferably be accompanied by de-registration from the first signaling agent, but this is not required.

It is possible for some mobile nodes 16 to be registered on one signaling agent and other mobile nodes 16 within the same mobile network 12 to be registered on another signaling agent. For example, the signaling agents may be able to support different kinds of update messaging to a directory agent; for example, mobile IPv4 and mobile IPv6. In this case, the mobile router will be registered with each signaling agent and send each message(s) when the mobile network changes its point of attachment on the fixed network 14.

When a mobile network 12 is about to leave the fixed network 14, the manner in which de-registration takes place will depend on how registration was previously achieved. For example, if each mobile node registered directly (through the mobile router), then each mobile node will de-register directly by sending a message to the signalling agent indicating to the signalling agent that it will no longer be required to send update messages to the mobile node's home agent. A mobile node will also send a de-registration message if the mobile node is about to leave the mobile network, even when the mobile network remains attached to the fixed network 14. A de-registration message. when a mobile node is about to leave the mobile network will be important, since without such de-registration, the signalling agent may continue to send to the home agent updated addresses which are no longer indicative of the mobile node's location.

FIG. 3 shows a further network system. The fixed network 14 may include one or more sub networks. For example, as shown in FIG. 3, the fixed network may include a ground network 141 and a transport network 142, the transport and ground networks each having respective border routers 151, 152, a link 153 being provided between the border routers to allow for communication between the ground network and the transport network. The home agents may not all be in the same sub network. For example HA1 may be in a ground network 141 and HA2 may be in a transport network 142.

In the case where the mobile network is a Personal Area Network (PAN), the network being formed by a group of nodes that is very localised and closely associated with a single person, travelling together as a single unit, a node may wish to communicate with another node within the PAN. It may also wish to communicate with a node in the main network. Such communication would be through one of the nodes within the PAN that acts as a gateway with the main network.

In another embodiment a mobile node (MN) does not obtain a temporary address from the Base Station. Instead the MN obtains an address from the mobile router 20 which is a "private address", that is to say the address is only meaningful, and should be used, within the mobile network 24. The mobile router includes "Network Address, Translator" (NAT) functionality whereby it stores a mapping between a MN's private address used within the mobile network and a public address, such that the mobile router has sufficient public addresses to allocate one to each MN. The public address is the address by which the MN is known within the main network. A packet sent to this address reaches the mobile router 20, which looks up this address in its mapping table and alters the address to the private address at which the MN can be reached within the mobile network 24. The opposite mapping process occurs in the reverse direction (that is, when a MN sends a packet to a node in the main network). When the mobile network moves to a new base station, it obtains a new set of public addresses. The MN's private address does not change, however the mobile router updates its mapping table by selecting a new one of its public addresses to map to a MN's private address. The mobile router sends a message to the signalling agent 34 informing it about each MN's new public address. The signalling agent 34 updates each of the MN's Home agents. In the case where the mobile router does not have sufficient public addresses to allocate one to each MN, then the mobile router includes "Network Address Port Translator" (NAPT) functionality whereby it stores a mapping between a MN's private address used within the mobile network and a public address combined with a port number. For example, in one embodiment the same public address is used for all the MNs. When the mobile network moves to a new base station, it obtains a new public address. The mobile router sends a message to the signalling agent 34 informing it of this new public address. The signalling agent 34 updates each of the MN's HAs with this new public address. Alternatively, a MN's permanent home address can be used within the mobile network 24, as though it were a "private address". In such a situation, the mobile router 20 will have NAT or NAPT functionality.

The mobile network 12 or some or all of the fixed network 14 may operate according to the IPv4 protocol. When the mobile network 12 is attached to those portions of the fixed network which operates using IPv4, the mobile nodes will preferably be allocated care of addresses which are not co-located, such that a base station attached to the mobile network will not store a mapping between the care of address of a mobile node and a radio channel, but will instead decapsulate the packet, and forward it to the correct mobile node using a mapping between the care of address of the mobile node and its permanent address (a mapping being provided between the permanent address and the correct radio channel).

In an another possible embodiment, when each mobile node is informed that it has a new care of address (because the mobile network has changed its point of attachment on the fixed network 14), then it sends an update message to its directory agent(s), for example to its home agent, and also the "calling nodes" C1,C2 if route optimisation is used. (In some others embodiments, the mobile nodes does not send such update messages). The mobile router has an additional interception stage 99, associated with its routing stage 36, which: (i) recognises such an update message, (ii) stores it temporarily, along with other similar update messages, (iii) creates a new message which contains several or all of the update messages that have been temporarily stored, (iv) sends the new message to the signaling agent. On receiving this message the signaling agent extracts the original update messages, which it then routes as normal i.e. to the directory agent(s). Preferably, the interception, stage 99 will recognise that a packet is an update message (rather than for instance an ordinary data packet) by examining the protocol number in the packet; the interception stage 99 is either pre-configured with the protocol numbers to look out for, or else a mobile node could inform it. Alternatively, the interception stage 99 will recognise that a packet is an update message (rather than for instance an ordinary data packet,) by examining the destination address in the packet, a mobile node having earlier informed the interception stage of the address of its home agent. This will reduce the need for mobile nodes to register with the signaling agent 34, but may increase the amount of traffic over the wireless link in comparison to the bandwidth needed in the case where the signaling stage 40 simply provides the signaling agent with a new location identifier each time the point of attachment changes.

In another embodiment a similar inception stage 101 is included within the Signalling Agent, which stage (i) recognises a response to a mobility update message (eg an Acknowledgement), (ii) stores it temporarily, along with other similar responses to update messages, (iii) creates a new message which contains several or all of the responses messages that have been temporarily stored, (iv) sends the new message to the mobile router. On receiving this message the mobile router extracts the original responses, which it then sends as normal to the mobile node(s). The interception may stage recognise that a packet is a response (rather than for instance an ordinary data packet) through the protocol number (and which mobile router it should send it to through the destination address). In order to be able to intercept a response message, the Signalling Agent will normally be on the forwarding path the response follows, for example it is located at the Base Station.

To allow for secure communication between nodes, a security relationship will normally be established prior to messages being sent. For example, a security relationship may be established between a mobile node and the signalling agent by the use of a shared secret or key. Likewise, a security relationship may be established between the mobile router and the signalling agent. The shared key may be in the form of a token, which token is sent to the signalling agent by a mobile node, such that the signalling agent can provide the token for the related home agent. Normally, each mobile node will provide to its respective home agent details of the token that the signalling agent will send to the home agent, so that the home agent can authenticate the signalling agent.

What is claimed is:

1. A telecommunications system comprising:
   a mobile network having a plurality of portable communication devices, and router means arranged in use for routing data to and from the portable communication devices; and
   a main network which includes a signalling agent, a plurality of directory agents, and a plurality of spaced apart attachment points to which the mobile network can attach in order to communicate with the main network,
   wherein, in use, each directory agent stores routing information for routing data to a respective portable communication device associated with that directory agent, and
   wherein, the signalling agent, in use, maintains a register of directory agents currently associated with the mobile network, the signalling agent being updated as portable communication devices attach to, and detach from, the mobile network, and wherein in response to a signalling message from which it is inferred that the point of attachment of the mobile network has changed, the signalling agent is configured to generate using the register respective update messages for each directory agent currently associated with the signalling agent for transmission to the respective directory agents, the update messages each including updated routing information such that on receipt of the updated routing information, each directory agent updates the stored routing information thereof so as to take into account the changed point of attachment of the mobile network.

2. A telecommunications system as claimed in claim 1, wherein:
   for each directory agent, the respective routing information stored by a directory agent includes information from which the point of attachment of the or each portable communication device associated with the directory agent is inferred.

3. A telecommunications system as claimed in claim 1, wherein the signalling message is indicative of the topological position of the changed point of attachment to which the mobile network is attached.

4. A telecommunications system as claimed in claim 1, wherein the mobile network is configured to send the signalling message.

5. A telecommunications system as claimed in claim 1, wherein:
   the attachment points are provided with respective wireless communication means,
   the mobile network including further wireless communication means such that a wireless link can be formed between an attachment point and the mobile network for communication therebetween.

6. A telecommunications system as claimed in claim 1, wherein the attachment points are stationary.

7. A telecommunications system as claimed in claim 6, wherein the attachment points are provided at respective ground base stations.

8. A telecommunications system as claimed in claim 1, wherein the signalling agent and at least one directory agent are each provided at one or more ground nodes.

9. A telecommunications system as claimed in claim 1, wherein at least some directory agents are located in different geographical locations to one another.

10. A telecommunications system as claimed in claim 1, wherein a plurality of signalling agents are provided in the main network, each signalling agent being configured to send an update message on behalf of a respective plurality of portable devices in the mobile network, each update message including updated routing information.

11. A telecommunications system as claimed in claim 1, wherein the main network has a predetermined topological structure.

12. A telecommunications system as claimed in claim 11, wherein the main network is formed from a plurality of nodes, and a plurality of links for connecting the nodes, each node in the main network having a respective network address for routing data thereto.

13. A telecommunications system as claimed in claim 12, wherein the respective addresses of the nodes are indicative of their respective topological position within the main network.

14. A telecommunications system as claimed in claim 13, wherein:
the addresses of the nodes are arranged in a hierarchical structure relatively to one another, each address including an ordered set of components, each node having a hierarchical level associated therewith, each component of an address corresponding to a hierarchical level, and a high level node at one hierarchical level is connected to a plurality of low level nodes which are at a lower hierarchical level, the addresses of the respective lower level nodes being such that the value of the component corresponding to the level of the higher level node is common to each lower level node.

15. A telecommunications system as claimed in claim 12, wherein each directory agent is located at a respective node, differently located directory agents having a different network address associated therewith.

16. A telecommunications system as claimed in claim 12, wherein:
each portable device has a network address associated therewith, which network address is retained by the portable device as the mobile network moves from one attachment point to another, and
the directory agent for each portable device stores a mapping between the network address for that portable device and a temporary address indicative of the current attachment point of the mobile network.

17. A telecommunications system as claimed in claim 16, wherein:
the mobile network is configured to send a signalling message to the signalling agent when the mobile network changes its point of attachment, the signalling message including at least one address, the address having a prefix portion in indicative of the topological position of the changed point of attachment, and
the update message from the signalling agent to each directory agent includes a respective address, the addresses each including the prefix portion indicative of the changed point of attachment.

18. A telecommunications system as claimed in claim 1, wherein the mobile network includes support means for supporting the portable devices, the support means being common to each of the portable devices, such that movement of the support means causes a common movement of the portable devices.

19. A telecommunications system as claimed in claim 1, wherein the mobile network is configured to send one or more registration messages to the signalling agent, which registration message(s) includes an indication of the identity of each directory agent to which the signalling agent is to send an update message.

20. A telecommunications system as claimed in claim 1, wherein the mobile network is a personal area network.

21. A telecommunications system as claimed in claim 1, wherein:
the signaling message is sent from the mobile network to the signaling agent as a single message.

22. A signalling agent for use in a telecommunications system, the telecommunications system including a main network and a mobile network, the mobile network including a plurality of portable communication devices and router means arranged in use for routing data to and from the portable communication devices, the main network including a plurality of spaced apart attachment points to which the mobile network can attach in order to communicate with the main network, and a plurality of directory agents, wherein the portable communication devices each have a directory agent associated therewith, each directory agent storing routing information for routing data to the or each portable communication device associated with that directory agent, wherein:
the signalling agent is configured to maintain a register of directory agents currently associated with the mobile network, the signalling agent being updated as portable communication devices attach to, and detach from, the mobile network, and to generate using the register respective update messages for each directory agent currently associated with the signalling agent for transmission to the respective directory agents in response to a signalling message from which signalling message it is inferred that the point of attachment of the mobile network has changed, each update message including updated routing information such that on receipt of the updated routing information, each directory agent updates the routing information thereof to take into account the changed point of attachment of the mobile network.

23. A signalling agent as claimed in claim 22, wherein:
the signaling agent receives the signaling message from the mobile network as a single message.

24. A network comprising:
a plurality of directory agents, each directory agent storing routing information for routing data to a respective mobile communication device of a mobile network;
a plurality of spaced apart attachment points to which, in use, a mobile network can attach in order to communicate with a main network; and
a signalling agent,
the signalling agent being configured to maintain a register of directory agents currently associated with the mobile network, the signalling agent being updated as mobile communication devices attach to, and detach from, the mobile network, and to generate using the register respective update messages for each directory agent currently associated with the signalling agent for transmission to the respective directory agents in response to a signalling message from which signalling message it is inferred that the point of attachment of the mobile network has changed,
each update message including updated routing information such that, on receipt of the updated routing information, each directory agent updates the routing information thereof to take into account the changed point of attachment of the mobile network.

25. A network as claimed in claim 24, wherein the signalling agent maintains, in respect of each mobile communication device, a mapping between an identifier for that mobile communication device on the one hand and on the other hand address information indicative of the topological position in the network of the directory agent associated with that mobile communication device.

26. A telecommunications system as claimed in claim 25, wherein the mobile network includes vehicle means.

27. A network as claimed in claim 24, wherein:
the signaling agent receives the signaling message from the mobile network as a single message.

28. A method of operating a network which includes a signalling agent, a plurality of directory agents each of which stores routing information for routing data to a respective mobile communication device associated with that directory agent, and a plurality of spaced apart attachment points to which a mobile network having a plurality of portable devices can attach in order to communicate with the main network, the method comprising:
   (i) storing an indication of the identity and/or network location of each directory agent currently associated with a portable device;
   (ii) receiving, from the mobile network, temporary address information indicative of the current point of attachment of the mobile network; and
   (iii) in response to receiving the temporary address information, using the stored indication of identity and/or network location to generate and send respective update message to each directory agent, the update messages each including updated routing information such that on receipt of the updated routing information, each directory agent updates the stored routing information thereof so as to take into account the changed point of attachment of the mobile network.

29. A method as claimed in claim 28, wherein:
the temporary address information is sent as a single message.

30. A signalling agent for use in a telecommunications system, the telecommunications system including a main network and a mobile network, the mobile network including first and second portable communication devices and a router for routing data to and from the first and second portable communication devices, the main network including a plurality of spaced apart attachment points to which the mobile network can attach in order to communicate with the main network, and first and second directory agents, wherein the first directory agent stores routing information for the first portable communication device and the second directory agent stores routing information for the second portable communication device, wherein:
   the signalling agent comprises a register for data identifying directory agents currently associated with the mobile network, and the signalling agent is configured to be updated in response to messages indicating the communication devices attach to, and detach from, the mobile network;
   the signalling agent is configured to generate and send a first update message to the first directory agent and send a second update message to the second directory in response to a signalling message received from the mobile network, the signalling message inferring that the point of attachment of the mobile network including the first and second portable communication devices has changed; and
   each of the first and second update messages includes updated routing information such that on receipt of the updated routing information, the first directory agent updates the routing information of the first portable communication device and the second directory agent updates the routing information of the second portable communication device to take into account the changed point of attachment of the mobile network.

31. A network comprising:
a first directory agent for storing routing information for routing data to a first mobile communication device of a mobile network;
a second directory agent for storing routing information for routing data to a second mobile communication device of the mobile network;
a plurality of spaced apart attachment points to which the mobile network can attach in order to communicate with the network; and
a signalling agent comprising a register for data identifying directory agents currently associated with the mobile network, and the signalling agent is configured to be updated in response to messages indicating the mobile communication devices attach to, and detach from. the mobile network;
the signalling agent being configured to generate and send a first update message to the first directory agent and a second update message to the second directory agent in response to a signalling message received from the mobile network, the signalling message inferring that the point of attachment of the mobile network has changed,
the first and second update messages including updated routing information such that, on receipt of the updated routing information, the first directory agent updates the routing information of the first mobile communication device and the second directory agent updates the routing information of the second mobile communication device to take into account the changed point of attachment of the mobile network.

* * * * *